(12) United States Patent
Kodama

(10) Patent No.: US 7,818,383 B2
(45) Date of Patent: Oct. 19, 2010

(54) E-MAIL SERVER

(76) Inventor: Shingo Kodama, 3-2-9-601 Minato, Chuo ku, Tokyo (JP) 104-0043

( * ) Notice: Subject to any disclaimer, the term of this patent is extended or adjusted under 35 U.S.C. 154(b) by 196 days.

(21) Appl. No.: 11/852,624

(22) Filed: Sep. 10, 2007

(65) Prior Publication Data

US 2008/0133680 A1 Jun. 5, 2008

(30) Foreign Application Priority Data

Nov. 30, 2006 (JP) ............................. 2006-322808

(51) Int. Cl.
*G06F 15/16* (2006.01)
(52) U.S. Cl. ...................... 709/206; 709/207
(58) Field of Classification Search ............... 709/206, 709/207
See application file for complete search history.

(56) References Cited

U.S. PATENT DOCUMENTS

| | | | |
|---|---|---|---|
| 2002/0087641 A1* | 7/2002 | Levosky | 709/206 |
| 2003/0009698 A1* | 1/2003 | Lindeman et al. | 713/201 |
| 2005/0198173 A1* | 9/2005 | Evans | 709/206 |
| 2006/0041621 A1* | 2/2006 | Libbey | 709/206 |
| 2006/0277264 A1* | 12/2006 | Rainisto | 709/206 |

FOREIGN PATENT DOCUMENTS

| | | |
|---|---|---|
| JP | 2003-196216 | 7/2003 |
| JP | 2005-208780 | 8/2005 |
| JP | 2006-185124 | 7/2007 |
| WO | WO 2004-070614 | 8/2004 |

\* cited by examiner

*Primary Examiner*—Joon H Hwang
*Assistant Examiner*—Chau D Le
(74) *Attorney, Agent, or Firm*—Toyomi Ohara; Konomi Takeshita

(57) ABSTRACT

An address determining means determines whether an e-mail address in an e-mail is an extended address or an original e-mail address of an e-mail account. The extended address is an e-mail address generated by adding an extension name to an account name in the original e-mail address. A receipt accepting means determines, based on the extended address, whether to accept receipt of an e-mail of which a destination address is the extended address or not. An e-mail receiving means receives the e-mail to the extended address as an e-mail to the e-mail account of the original e-mail address after the receipt accepting means accepts receipt of the e-mail.

11 Claims, 11 Drawing Sheets

FIG. 2

| original e-mail address | extended address | receiver address |
|---|---|---|
| taro@foo.com | abc.taro@foo.com | cs@store.com |

FIG.3

| blacklist | | |
|---|---|---|
| extended address | receiver address | original e-mail address |
| xyz.hanako@foo.com | cs@shop.com | hanako@foo.com |

FIG. 7A

```
From: taro@foo.com          61
To: abc@xyz.com
Subject: Hello

| original e-mail address | extended address | receiver address |
|---|---|---|
| ⋮ | | |
| taro@foo.com | 4dx6g2sa.taro@foo.com | abc@xyz.com |
| ⋮ | | |

```
From: 4dx6g2sa.taro@foo.com    62
To: abc@xyz.com
Subject: Hello

..........
```

E-MAIL SERVER

CROSS-REFERENCE TO RELATED APPLICATIONS

This application relates to and claims priority rights from Japanese Patent Application No. 2006-322808, filed on Nov. 30, 2006, the entire disclosure of which is hereby incorporated by reference herein.

BACKGROUND OF THE INVENTION

1. Field of the Invention

The present invention relates to an e-mail server.

2. Description of the Related Art

In recent years, under expansion of Internet, e-mail system is used broadly. Therefore, a user sometimes fills in his/her e-mail address as contact information in Internet shopping, user registration on Web, a survey on Web etc.

Such e-mail address filled in is usually managed as personal information so that the e-mail address is usually not leaked. However, it is occasionally leaked due to some causes, if leaked, SPAM mails for advertisement often come to the leaked e-mail address. In another case, a user may receive an e-mail virus from a friend if the friend's computer is infected with the virus. A sender (i.e. a sender's e-mail address) of a nuisance e-mail such as SPAM mail and e-mail virus is often disguised, and if it happens, it is difficult to identify the real sender and stop sending such nuisance e-mails.

For e-mail client programs sending/receiving e-mails, some techniques has been developed to discriminate and/or remove nuisance e-mails. In the techniques, an e-mail is received firstly, then it is determined whether the e-mail is a nuisance e-mail or not based on content of the e-mail. For example, such technique is described in Japanese Patent Application Laid-Open Gazette No. 2005-208780.

SUMMARY OF THE INVENTION

Many nuisance e-mails can be discriminated by using such conventional method. However, nuisance e-mails sent to the user do not decrease even if such conventional method is used, therefore it is not complete solution. In course of time, a large number of nuisance e-mails are sent to the user. In that situation, it may be to discard an important e-mail with many nuisance e-mails in error. The user may check titles and/or senders of e-mails one by one to prevent from discarding the important e-mail in error, but it takes a lot of time.

The present invention has been completed in consideration of the above circumstances. An object of the present invention is to provide an e-mail server device and an e-mail server program capable to block nuisance e-mails totally.

By this invention, the above problem can be solved as follows.

An e-mail server device of the present invention comprises: an address determining means for determining whether an e-mail address in an e-mail is an extended address or an original e-mail address of an e-mail account, the extended address is an e-mail address generated by adding an extension name to an account name in the original e-mail address; a receipt accepting means for determining, based on the extended address, whether to accept receipt of an e-mail of which a destination address is the extended address or not; and an e-mail receiving means for receiving the e-mail to the extended address as an e-mail to the e-mail account of the original e-mail address after the receipt accepting means accepts receipt of the e-mail.

Furthermore, an e-mail server device of the present invention may be designed by modifying the above e-mail server device as follows. The e-mail server device further comprises an e-mail storing means for storing an e-mail to the original e-mail address into a storing region of the original e-mail address. The e-mail receiving means supplies only the e-mail accepted by the receipt accepting means to the e-mail storing means, and the e-mail storing means stores the e-mail in the storing region of the original e-mail address in association with the extended address of the e-mail.

Furthermore, an e-mail server device of the present invention may be designed by modifying one of the above e-mail server devices as follows. The e-mail server device further comprises a list having at least one extended address, e-mails to the extended address should be denied of the receipt. The receipt accepting means determines whether to accept the receipt or not by referring to the list.

Furthermore, an e-mail server device of the present invention may be designed by modifying one of the above e-mail server devices as follows. The e-mail server device further comprises an e-mail sending means for sending an e-mail after changing a sender e-mail address to an extended address in association with an original e-mail address if the sender e-mail address in the e-mail is the original e-mail address.

Furthermore, an e-mail server device of the present invention may be designed by modifying one of the above e-mail server devices as follows. The e-mail sending means changes the sender e-mail address to a different extended address according to a destination of the e-mail to be sent.

Furthermore, an e-mail server device of the present invention may be designed by modifying one of the above e-mail server devices as follows. The e-mail server device further comprises a table having a relationship between a destination address and an extended address. The e-mail sending means refers to the table and changes the sender e-mail address to the extended address associated with the destination address of the e-mail if the destination address of the e-mail has been registered in the table. If the destination address of the e-mail has not been registered in the table, the e-mail sending means generates an extended address automatically, registers the generated extended address in the table, and changes the sender e-mail address to the generated extended address.

Furthermore, an e-mail server device of the present invention may be designed by modifying one of the above e-mail server devices as follows. The e-mail server device further comprises a first list in which at least one sender from who an e-mail may be received is registered; and a second list in which at least one sender from who an e-mail must not be received is registered. The e-mail receiving means receives an e-mail if a sender of the e-mail has been registered in the first list and does not receive an e-mail if a sender of the e-mail has been registered in the second list. If a sender of an e-mail has been registered in neither the first list nor the second list, the e-mail receiving means sends a confirmation e-mail to the sender of the e-mail, then receives the e-mail only if the e-mail receiving means receives a response from the sender in a method described in the confirmation e-mail.

Furthermore, an e-mail server device of the present invention may be designed by modifying one of the above e-mail server devices as follows. The e-mail receiving means registers the sender of the e-mail in the first list if the e-mail receiving means receives the response after sending the confirmation e-mail, and registers the sender of the e-mail in the second list if said e-mail receiving means does not receive the response within a predetermined time after sending the confirmation e-mail.

Furthermore, an e-mail server device of the present invention may be designed by modifying one of the above e-mail server devices as follows. The e-mail server device further comprises a table having a relationship between a domain of a destination address and an extended address. The e-mail sending means refers to the table and changes the sender e-mail address to the extended address associated with a domain of the destination address of the e-mail if the domain of the destination address of the e-mail has been registered in the table. If the domain of the destination address of the e-mail has not been registered in the table, the e-mail sending means generates an extended address automatically, registers the generated extended address to the table, and changes the sender e-mail address to the generated extended address.

Furthermore, an e-mail server device of the present invention may be designed by modifying one of the above e-mail server devices as follows. The e-mail server device further comprises a first list in which at least one sender from who an e-mail may be received is registered; and a second list in which at least one sender from who an e-mail must not be received is registered. The e-mail receiving means receives an e-mail if a sender of the e-mail has been registered in the first list and does not receive an e-mail if a sender of the e-mail has been registered in the second list. If a sender of an e-mail has been registered in neither the first list nor the second list, the e-mail receiving means returns BUSY status at first, and receives an e-mail only if the e-mail comes from the same sender again.

Furthermore, an e-mail server device of the present invention may be designed by modifying one of the above e-mail server devices as follows. The extended address consists of the extension name at the head, a delimiter between the extension name and the original e-mail address, and the original e-mail address.

Furthermore, an e-mail server device of the present invention may be designed by modifying one of the above e-mail server devices as follows. The e-mail receiving means changes the extended address as a destination address of the e-mail accepted by the receipt accepting means to the original e-mail address.

Furthermore, an e-mail server device of the present invention may be designed by modifying one of the above e-mail server devices as follows. The e-mail receiving means inserts the extension name into a title of the received e-mail.

An e-mail server device of the present invention comprises: a computer which executes an e-mail server program. The computer determines whether an e-mail address in an e-mail is an extended address or an original e-mail address of an e-mail account, the extended address is an e-mail address generated by adding an extension name to an account name in the original e-mail address; the computer determines, based on the extended address, whether to accept receipt of an e-mail of which a destination address is the extended address or not; and the computer receives the e-mail to the extended address as an e-mail to the e-mail account of the original e-mail address after receipt of the e-mail is accepted.

A computer-readable medium having computer-executable program for execution by a processing system, the computer-executable program for enabling an e-mail server device, of the present invention comprises: instructions for determining whether an e-mail address in an e-mail is an extended address or an original e-mail address of an e-mail account, the extended address is an e-mail address generated by adding an extension name to an account name in the original e-mail address; instructions for determining, based on the extended address, whether to accept receipt of an e-mail of which a destination address is the extended address or not; and instructions for receiving the e-mail to the extended address as an e-mail to the e-mail account of the original e-mail address after receipt of the e-mail is accepted.

According to the present invention, it is capable to block nuisance e-mails totally based on a destination address of an e-mail coming to an e-mail server.

BRIEF DESCRIPTION OF THE DRAWINGS

FIG. 2 shows an example of a table in the extended address storing part in FIG. 1.

FIG. 3 shows an example of a blacklist in the extended address storing part of FIG. 1.

FIG. 7A to 7C show a replacing process of a sender e-mail address when an e-mail is sent in Embodiment 1. FIG. 7A shows an e-mail before the sender e-mail address is changed. FIG. 7B shows a table containing a relationship between a receiver address and an extended address. FIG. 7C shows an e-mail after the sender e-mail address is changed.

FIG. 11A shows an example of a confirmation e-mail. FIG. 11B shows an example of a confirmation page.

DETAILED DESCRIPTION OF THE PREFERRED EMBODIMENT

Embodiments of the present invention will be explained below based on the drawings.

Embodiment 1

Figure 1:
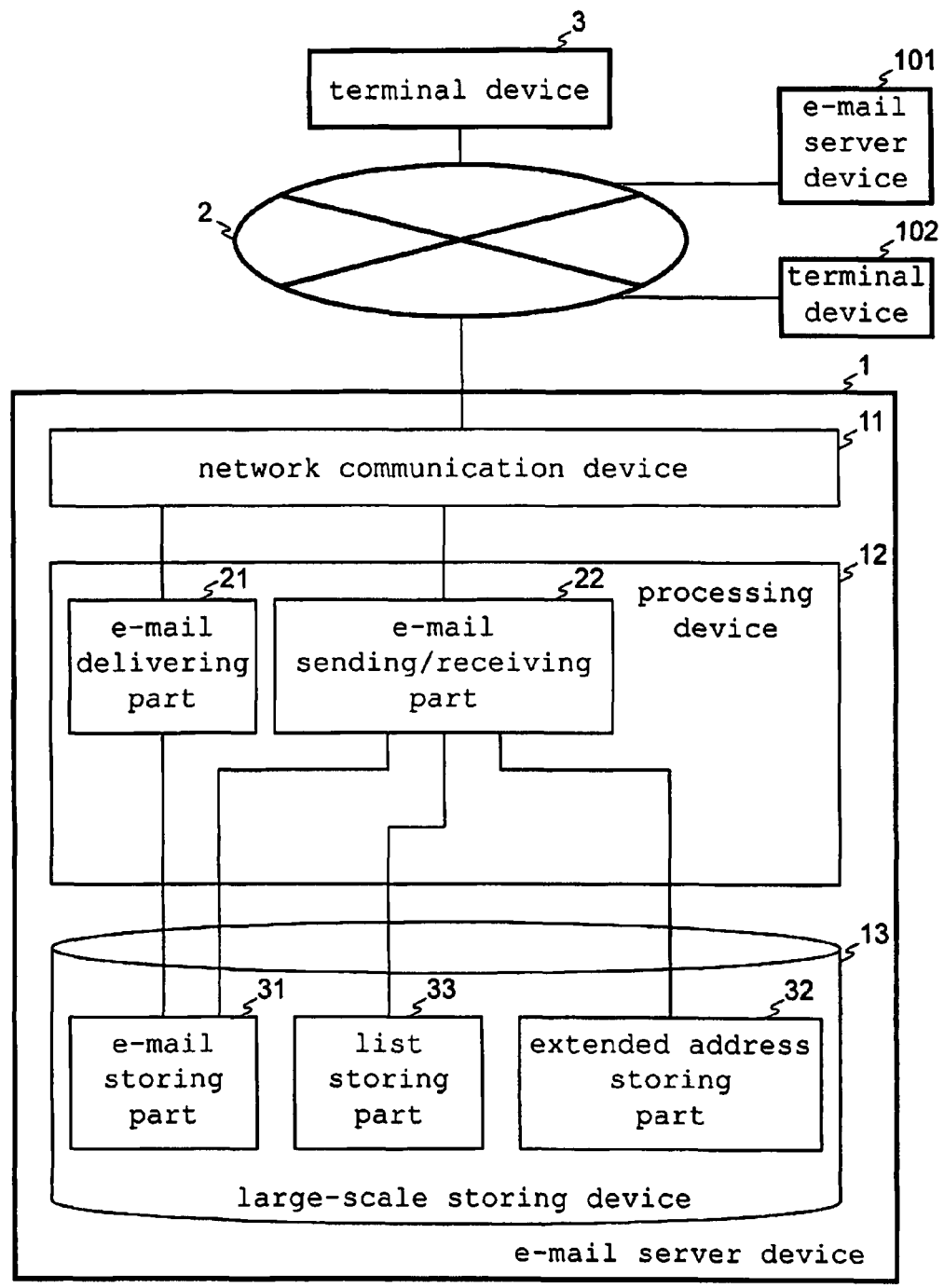
FIG. 1 shows a block diagram that depicts a configuration of a communication system having an e-mail server device according to Embodiment 1 of the present invention.

FIG. 1 shows a block diagram that depicts a configuration of a communication system having an e-mail server device according to Embodiment 1 of the present invention. In FIG. 1, an e-mail server device 1 is an e-mail server device according to Embodiment 1 of the present invention. A network 2 is a computer network such as Internet etc. A terminal device 3 is a client device such as a personal computer etc. operated by a user (User A) having an e-mail account in the e-mail server device 1. The e-mail server device 1 and the terminal device 3 are connected to the network 2.

Furthermore, an e-mail server device 101 is another e-mail server device connected to the network 2. A terminal device 102 is a client device operated by a user (User B) having an e-mail account in the e-mail server device 101.

For example, when User A sends an e-mail to User B, the e-mail is transmitted from a e-mail client program in the terminal device 3 to the e-mail server device 1, then transmitted from the e-mail server device 1 to the e-mail server 101 based on SMTP (Simple Mail Transfer Protocol) etc. Afterward, the e-mail is downloaded from the e-mail server device 101 to the terminal device 102 based on POP3 (Post Office Protocol 3) etc.

In Embodiment 1, the e-mail server device 1 is a device implemented in a computer etc. inside, and has a network communication device 11, a processing device 12 and a large-scale storing device 13. The network communication device 11 is a device such as a network interface card connected to the computer. The processing device 12 is a device acting as processing parts by executing an e-mail server program with the computer. The computer has a processing unit such as CPU/MPU, a RAM, a ROM etc. The e-mail server program has instructions for enabling the e-mail server device 1 on the computer. The program is stored in a computer-readable medium such as the device 13, the ROM in the computer, a portable optical disc such as CD-ROM etc. The large-scale storing device 13 is a device storing data such as a hard disc drive, disc array etc.

Furthermore, in this processing device 12, an e-mail delivering part 21 and an e-mail sending/receiving part 22 are embodied by executing the e-mail server program stored in the storing medium not shown in the figures with the computer inside.

The e-mail delivering part 21 is a processing part delivering an e-mail to a user to the terminal device 3 of the user based on an e-mail acquiring protocol such as POP3 etc. when the user accesses this e-mail server device 1.

The e-mail sending/receiving part 22 is a processing part sending/receiving an e-mail to/from another e-mail server device such as the e-mail server device 101 based on an e-mail transfer protocol such as SMTP etc. and storing a received e-mail in an e-mail storing part 31. The received e-mail is stored in a mailbox (a mailbox folder) of an e-mail account in association with a destination of the received e-mail.

In addition, the e-mail sending/receiving part 22 has (1) e-mail account integration function, (2) receipt denial function, (3) blacklist registration function and (4) e-mail address replacement function other than e-mail sending/receiving function.

The "(1) e-mail account integration function" is a function for determining whether a destination address of an e-mail from another e-mail server device such as device 101 is an original e-mail address or an extended address, and for storing the e-mail in a mailbox (a mailbox folder in a file system) of the original e-mail address in association with an extended address if the destination address is the extended address.

The "original e-mail address" means an e-mail address consisting of an e-mail account name, an "@" mark and a domain name. Namely, the original e-mail address is a conventional e-mail address usually used.

The "extended address" means an e-mail address generated by adding an extension name to an account name of an original e-mail address. In other words, an extended address contains an original e-mail address and an extension name. For example, here is an extended address in which a delimiter is put before the e-mail account name of the original e-mail address and the extension name is put before the delimiter.

In an original e-mail address "taro@foo.com," "taro" is an e-mail account name, and "foo.com" is a domain name. In case of adding an extension name "abc" to it, the extended address is "abc.taro@foo.com." The delimiter in this case is "." (a dot). One of plural different extension names may be used. For example, when the extension name consists of eight characters, the number of available extended addresses is the eighth power of 37 character sorts (a-z, 0-9, -), that is, about 350 million available extended addresses can be derived from one original e-mail address.

The "(2) receipt denial function" is a function for denying receipt of an e-mail if a destination address of the e-mail is an extended address registered in a blacklist of a list storing part 33 when the e-mail comes to the user having e-mail accounts in the e-mail server device 1. The denied e-mail is discarded without storing it in any mailboxes. Moreover, for denying receipt, with discarding of the e-mails, a return e-mail may be sent to the sender of the discarded e-mail.

The "(3) blacklist registration function" is a function for registering an extended address in the blacklist of the list storing part 33 when receiving an instruction e-mail sent to a predetermined e-mail address from a user and the instruction e-mail has a blacklist registration instruction and the extended address specified by the user.

The "(4) e-mail address replacement function" is a function for replacing an original e-mail address as a sender address with an extended address and sending the e-mail after the replacement when an e-mail is sent by a user having an e-mail account in the e-mail server device 1.

Furthermore, by allocating storing regions in the large-scale storing device 13 in FIG. 1, the e-mail storing part 31, an extended address storing part 32 and the list storing part 33 are embodied as the storing regions.

The e-mail storing part 31 is a storing region having a mailbox for every e-mail account (i.e. every user), for keeping received e-mails to every e-mail account in the mailbox.

The extended address storing part 32 is a storing region for keeping an extended address as a sender address of an e-mail to be sent in a table 41 together with a destination address of the e-mail and the original e-mail address in association with the extended address. FIG. 2 shows an example of the table 41 in the extended address storing part 32 in FIG. 1. In the table 41, an original e-mail address 42, an extended address 43 as a sender address, and a receiver address 44 being a destination address of an e-mail to be sent are registered and associated with one another.

The list storing part 33 is a storing region for keeping a blacklist containing one or more extended addresses as targets of receipt denial. FIG. 3 shows an example of a blacklist 51 in the extended address storing part 32 of FIG. 1. In the blacklist 51, each extended address as a target of receipt denial and a receiver address associated with the extended address are registered together.

Next, operations of the e-mail server device 1 in Embodiment 1 will be explained.

Figure 4:
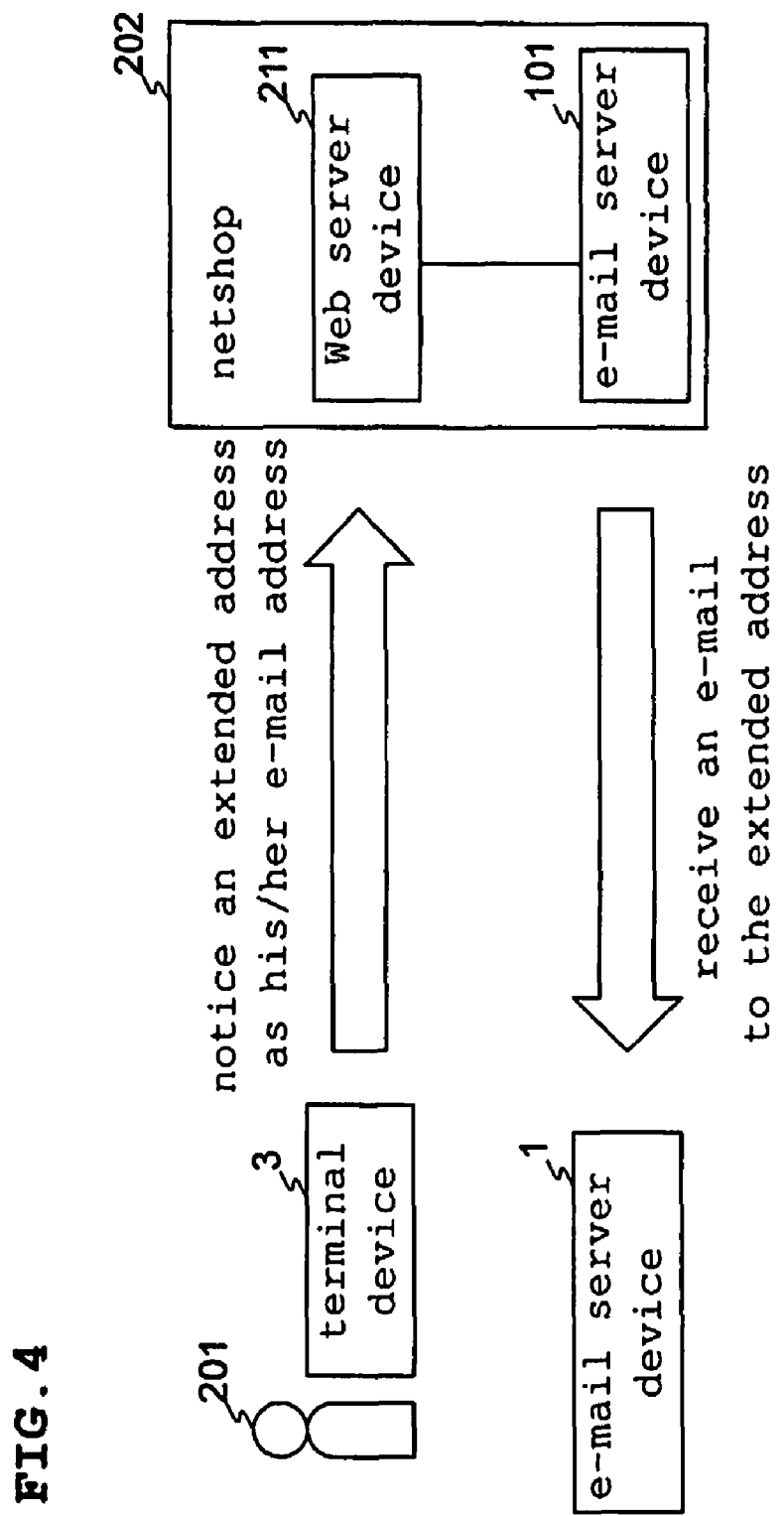
FIG. 4 shows explanation of transmission of e-mail address information when accessing to a netshop.

As shown in FIG. 4, for example, a user 201 has an e-mail account in the e-mail server device 1, and accesses an Web server device 211 of a netshop 202 for Internet shopping etc. by using the terminal device 3. When the user 201 has to fill in his/her e-mail address in the netshop 202, the user 201 fills in an extended address selected arbitrarily rather than his/her original e-mail address. Consequently, the user will receive e-mails sent to the extended address from the netshop 202 etc. The user may have plural extended addresses. For example, the user may have a different extended address for every shop.

In case of letting familiar friends know the user's original e-mail address, the user receives e-mails sent to the original e-mail address from the friends.

Such e-mails are transmitted via the network 2 to the e-mail server device 1. When the e-mails reach the device 1, the e-mail server device 1 executes a receiving process of each e-mail.

Figure 5:
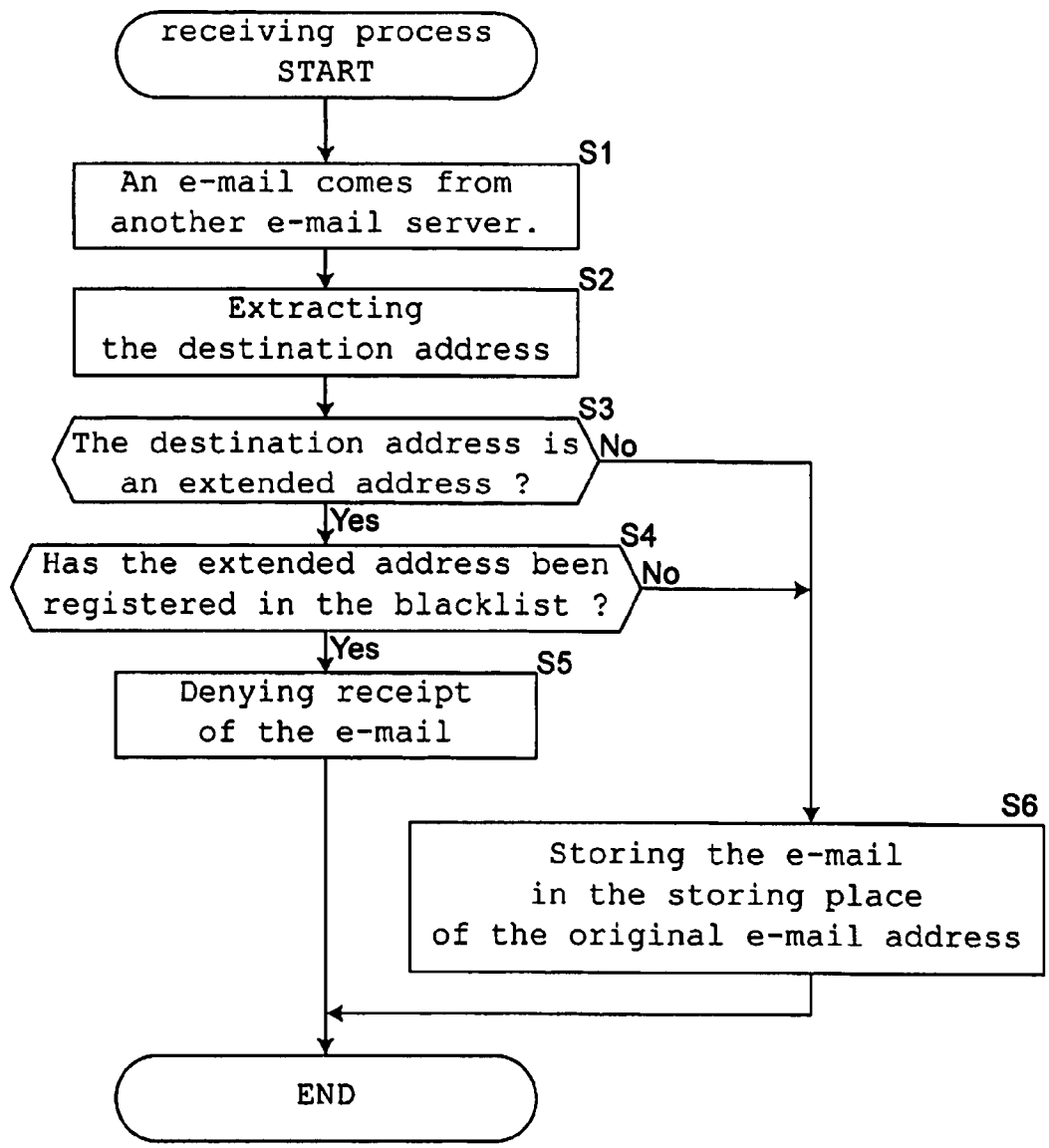
FIG. 5 shows a flowchart explaining a receiving process by the e-mail server device in Embodiment 1.

Firstly, a receiving process by the e-mail server device 1 in Embodiment 1 will be explained. FIG. 5 shows a flowchart explaining a receiving process by the e-mail server device 1 in Embodiment 1.

When the e-mail sending/receiving part 22 obtains an e-mail from another e-mail server 101 through the network communication device 11 (Step S1), the part 22 firstly extracts the destination e-mail address from the e-mail (Step S2).

Next, the e-mail sending/receiving part 22 determines whether the extracted destination e-mail address is an extended address or not (Step S3). For example, if the account name part of the extracted destination e-mail address contains a delimiter, and the part after the delimiter is the same as any of the original e-mail addresses of e-mail accounts managed in the server device 1, then the e-mail sending/receiving part 22 determines the destination e-mail address is an extended address; if not, then the e-mail sending/receiving part 22 determines the destination e-mail address is an original e-mail address.

When the e-mail sending/receiving part 22 determines the destination e-mail address is an extended address, then the part 22 determines whether the extended address has been registered in the blacklist 51 or not (Step S4).

If the extended address has been registered in the blacklist 51, the e-mail sending/receiving part 22 denies receipt of the e-mail (Step S5). On the other hand, if the extended address has not been registered in the blacklist 51, the e-mail sending/receiving part 22 accepts receipt of the e-mail and stores the e-mail in the e-mail storing part 31 (Step S6). In the e-mail storing part 31, the e-mail is stored in the mailbox of the original e-mail address in association with the extended address.

Otherwise, in Step S3, when it is determined that the extracted destination e-mail address is not any of extended addresses, the e-mail sending/receiving part 22 accepts receipt of the e-mail and stores the e-mail in the e-mail storing part 31 (Step S6). In the e-mail storing part 31, the e-mail is stored in the mailbox of the original e-mail address. Even when it is determined that the extracted destination e-mail address is not any of extended addresses, however, if the destination address is not any of the e-mail accounts in this server 1, the part 22 naturally denies receipt of the e-mail.

Consequently, in the view of a user having an e-mail account in the server device 1, not only e-mails to the original e-mail address but e-mails to the extended address reach one e-mail account of the user, then these e-mails can be downloaded all together at once from the server device 1 to the terminal device 3 of the user using an e-mail client program.

Figure 6:
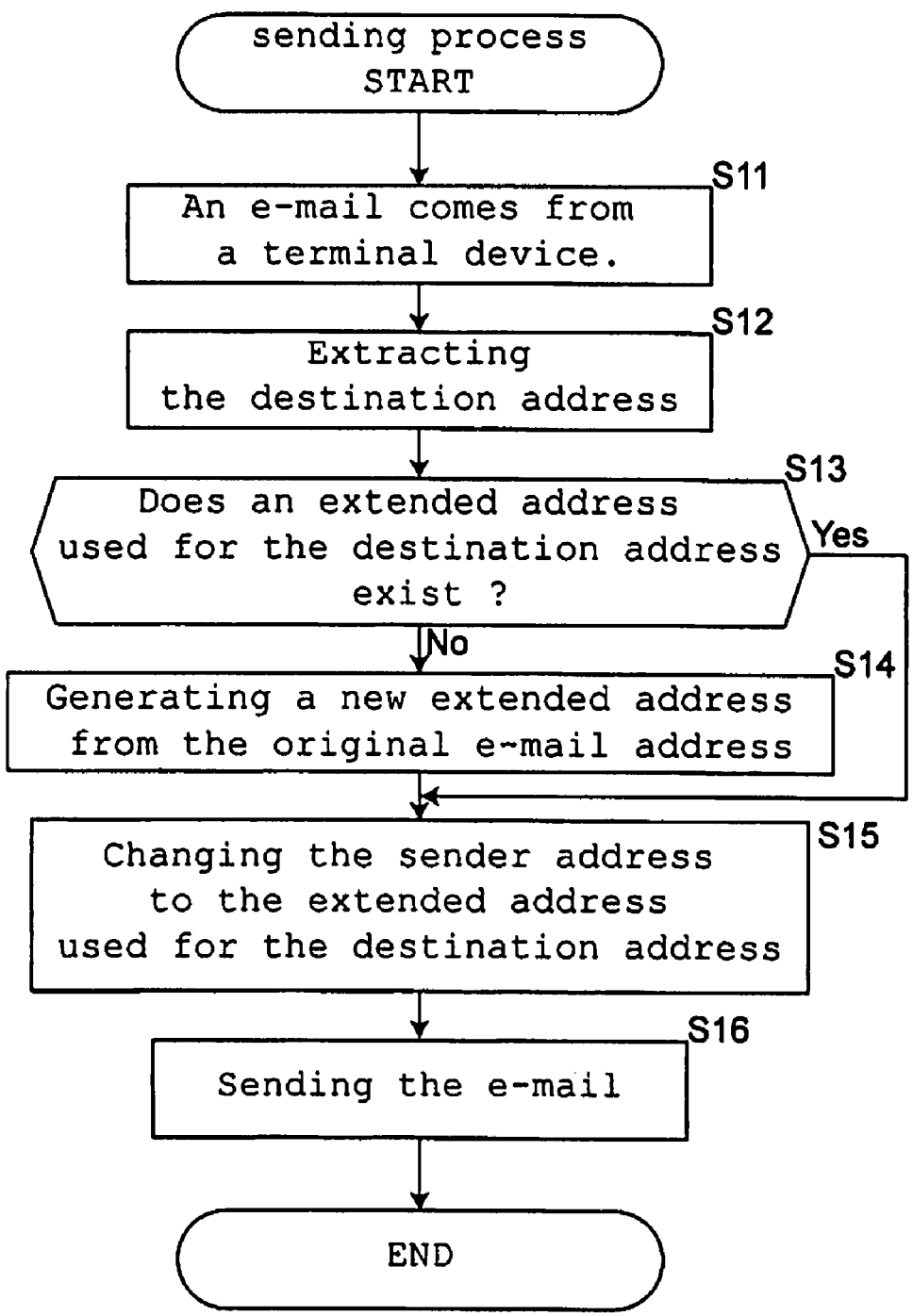
FIG. 6 shows a flowchart explaining a sending process of the e-mail server device in Embodiment 1.

Secondly, the process when the server device 1 sends an e-mail will be explained. FIG. 6 shows a flowchart explaining a sending process of the e-mail server device 1 in Embodiment 1.

The terminal device 3 sends an e-mail in accordance with the e-mail client program based on operations of the user, then the e-mail reaches the e-mail server device 1 by SMTP etc. (Step S11).

The e-mail sending/receiving part 22 extracts the destination e-mail address from the e-mail (Step S12), and determines whether or not the destination e-mail address has been registered as a receiver address 44 in the table 41 of the extended address storing part 32 (Step S13).

If the destination e-mail address has not been registered as any of the receiver addresses in the table 41, the e-mail sending/receiving part 22 generates an extension name with the predetermined number of characters automatically by using random number generation etc., and generates a new extended address from the extension name, a predetermined delimiter, and the original e-mail address of the user as the sender (Step S14). If the new extended address has been registered in the table 41, the e-mail sending/receiving part 22 generates another new extended address again up to generating a new extended address not registered in the table 41. Then, the e-mail sending/receiving part 22 adds and registers the new extended address with the destination e-mail address (i.e. the receiver address 44) in the table 41.

If the destination e-mail address has been registered as any of the receiver addresses in the table 41, the e-mail sending/receiving part 22 reads an extended address in association with the destination e-mail address from the table 41.

Thus, after identifying the extended address related to the destination e-mail address of the e-mail to be sent, the e-mail sending/receiving part 22 changes the sender e-mail address of the e-mail from the original e-mail address (that is, an e-mail address described by an e-mail client program in the terminal device 3) to the identified extended address (Step S15), then sends the e-mail into the network 2 (Step S16).

FIG. 7A to 7C show a replacing process of a sender e-mail address when an e-mail is sent in Embodiment 1. When an e-mail 61 shown in FIG. 7A is received from the terminal device 3 by the e-mail server device 1, the e-mail sending/receiving part 22 refers to the table 41 shown in FIG. 7B, and determines whether or not the destination address "abc@xyz.com" has been registered as the receiver address related to the sender address "taro@foo.com" of the e-mail 61. In the status shown FIG. 7B, the destination address has been registered; therefore, the e-mail sending/receiving part 22 reads the extended address "4dx6g2sa.taro@foo.com" related to the destination address. Then, as shown in FIG. 7C, the e-mail sending/receiving part 22 sends an e-mail 62 generated by changing the sender address to the extended address "4dx6g2sa.taro@foo.com" in the e-mail 61.

In this way, a sender e-mail address of an e-mail sent by a user of the terminal device 3 is replaced with an extended address in the e-mail server device 1. Consequently, the user is not required to manage the extended address with the e-mail client program in the terminal device 3. In addition, even if the user sends an e-mail in Internet shopping etc., it can be prevented to leak the original e-mail address.

Hereinafter, the blacklist registration process will be explained.

If the e-mail address of the user is leaked from a netshop as a receiver of the e-mail, the user receives nuisance e-mails to the extended address. If the user determines the received e-mail is a nuisance e-mail and wants to block nuisance e-mails to the extended address, then the user uses the e-mail client program in the terminal device 3 and sends an instruction e-mail to a predetermined e-mail address for blacklist registration. The instruction e-mail specifies the extended address to be registered. Otherwise, the user may forward a nuisance e-mail to the e-mail address for blacklist registration by using the e-mail client program when the nuisance e-mail is received for an extended address.

The e-mail account of the e-mail address for blacklist registration is possessed by the e-mail sending/receiving part 22. The e-mail sending/receiving part 22 receives the instruction e-mail specifying the extended address to be registered in the blacklist, then extracts the extended address from the instruction e-mail and registers the extended address in the blacklist 51.

At the time, the e-mail sending/receiving part 22 refers to the table 41 of the extended address storing part 32, identifies a receiver address 44 in association with the extended address 43, and registers the receiver address 44 in the blacklist 51 together with the extended address. Moreover, at the time, the e-mail sending/receiving part 22 may generate an e-mail having the extended address to be registered and the receiver address and send it to the original e-mail address of the user in order to notify the receiver address causing nuisance e-mails as a source of the e-mail address leakage to the user.

In this way, the blacklist 51 is built for filtering received e-mails (Step S4). It should be noted that receipt is denied of e-mails to the extended address registered in the blacklist 51; therefore, the user should notify another extended address to parties/persons whom the user wants to communicate with in future among the parties/persons for whom the user uses the extended address. If a destination e-mail address of an e-mail to be sent has been registered in the table 41 and an extended address 43 related to the destination e-mail address has been registered in the blacklist 51, then the e-mail sending/receiving part 22 may generate another extended address automatically, and may change the extended address 43 in the table 41 to the generated extended address. When an extended address related to a certain destination address (i.e. a receiver address 44) has been changed, the changed extended address is used as a sender e-mail address of e-mails sent to the destination address in future.

As described above, according to the aforementioned Embodiment 1, the e-mail sending/receiving part 22 as an address determining means determines whether an e-mail address in an e-mail is an extended address or an original e-mail address of an e-mail account. The e-mail sending/receiving part 22 as a receipt accepting means determines based on the extended address whether to accept receipt of an e-mail of which a destination address is the extended address or not. The e-mail sending/receiving part 22 as an e-mail receiving means receives the e-mail to the extended address as an e-mail to the e-mail account of the original e-mail address after accepting receipt of the e-mail.

Thus, other than an ordinary e-mail address, one or more extended addresses derived from the e-mail address can be used for one e-mail account. Therefore, by determining whether or not e-mails are blocked for every extended address independently, it is possible to block only e-mails sent to one or more specified extended addresses selectively and totally. Consequently, nuisance e-mails can be blocked totally. Furthermore, since an original e-mail address of an e-mail account is different from an original e-mail address of any other e-mail account, an extended address derived from the original e-mail address does not overlap with any other extended addresses derived from any other original e-mail addresses even if plural extended addresses are used for every original e-mail address.

Further, according to the aforementioned Embodiment 1, the e-mail sending/receiving part 22 supplies only e-mails accepted of receipt to e-mail storing part 31; the e-mail storing part 31 as an e-mail storing means stores only the accepted e-mails in the mailbox as a storing region of the original e-mail address in association with the extended address of the e-mail. Therefore, a user can manage received e-mails including e-mails sent to one or more extended addresses and e-mails sent to the original e-mail address in one e-mail account.

Furthermore, according to the aforementioned Embodiment 1, the e-mail sending/receiving part 22 as an e-mail sending means sends an e-mail after changing a sender e-mail address to the extended address in association with an original e-mail address if the sender e-mail address is the original e-mail address. Therefore, since the original e-mail address is not used as a sender e-mail address in an e-mail to be sent, the original e-mail address is not leaked and it rarely occurs to receive nuisance e-mails to the original e-mail address.

Furthermore, according to the aforementioned Embodiment 1, the e-mail sending/receiving part 22 changes a sender e-mail address to one of different extended addresses according to a destination of an e-mail to be sent. Therefore, even if a nuisance e-mail to an extended address is received, the source leaking the address can be determined base on the extended address being the destination e-mail address of the nuisance e-mail.

Furthermore, according to the aforementioned Embodiment 1, the extended address storing part 32 stores the table 41 having each relationship between each destination and each extended address. The e-mail sending/receiving part 22 refers to the table 41 and changes a sender e-mail address in an e-mail to an extended address associated with a destination of the e-mail if the destination has been registered in the table 41. If the destination of the e-mail has not been registered in the table 41, the e-mail sending/receiving part 22 generates an extended address in relation with the destination of the e-mail automatically, registers it in the table 41, and changes the sender e-mail address to it. The generated extended address is different from ones in relation with any other destinations. Therefore, since one extended address is assigned to one destination of an e-mail automatically in the server device 1 when the e-mail is being sent, a user who uses an e-mail client program in the terminal device 3 can use his/her original e-mail address in an ordinary manner. That is, it is not required to modify the e-mail client program to manage the extended address. In addition, it is not required to set an extended address for every destination in advance, so that operations for sending an e-mail do not bother the user.

Embodiment 2

In Embodiment 2, a process is executed for determining whether receipt of the e-mail is accepted or denied when an e-mail sent to an original e-mail address reaches the server device 1, where an e-mail sent to an original e-mail address reaches the e-mail server device 1 and is stored in the mailbox related to the original e-mail address without any special processing in Embodiment 1.

In Embodiment 2, other than the blacklist 51 described above, a whitelist 71 and a blacklist 72 are stored in the list storing part 33 in order to determine whether receipt is accepted or denied of e-mails sent to an original e-mail address.

Figure 8:
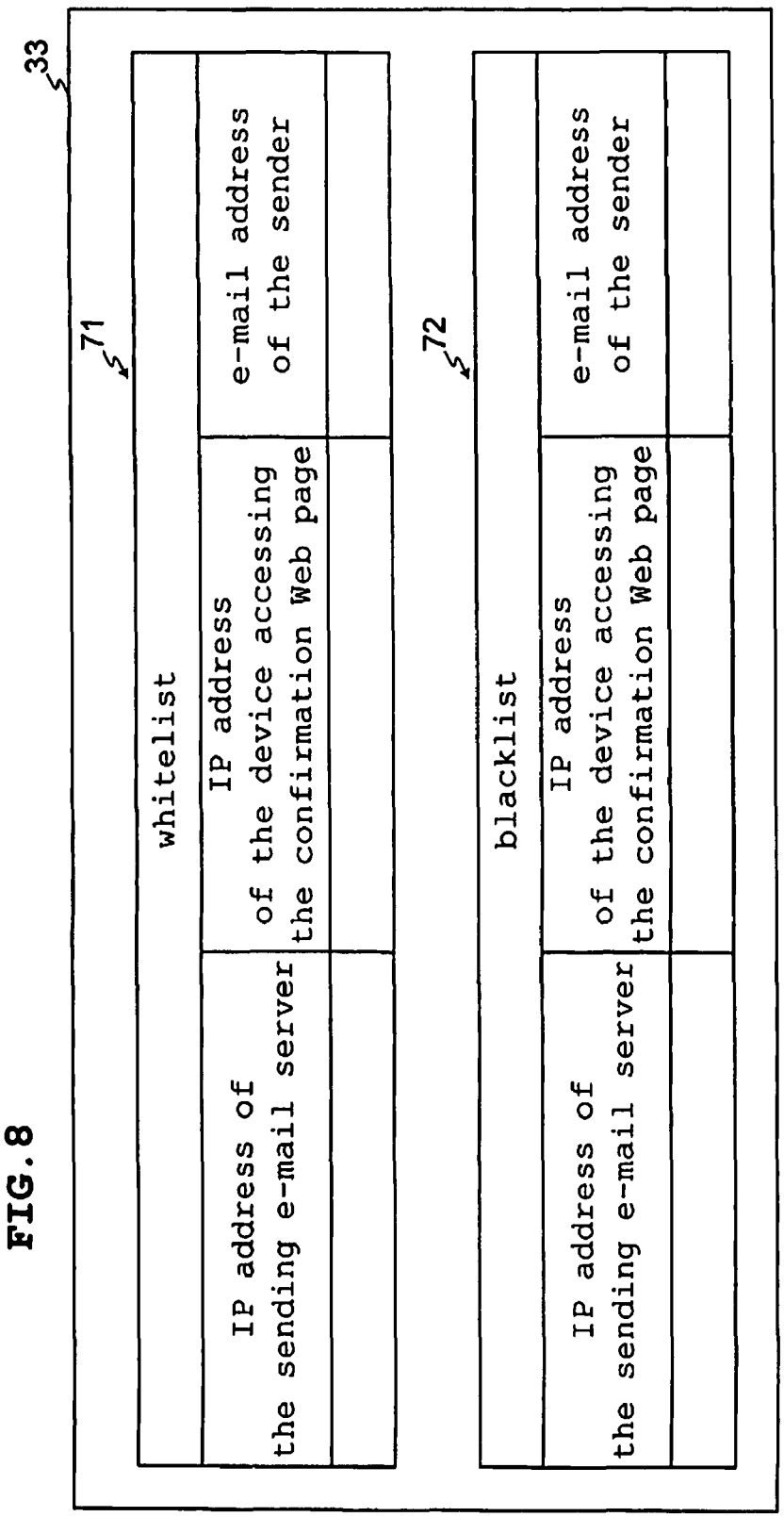
FIG. 8 shows a whitelist and a blacklist in Embodiment 2.

FIG. 8 shows the whitelist 71 and the blacklist 72. The whitelist 71 is a first list in which one or more senders are registered and it is accepted to receive e-mails from any of one or more senders registered in the whitelist 71. The blacklist 72 is a second list in which one or more senders are registered and it is denied to receive e-mails from any of one or more senders registered in the blacklist 72.

In each of the lists 71 and 72, (a) an IP address of an e-mail server device of a sender, (b) an IP address of a terminal device accessing a confirmation page on Web (described later) and (c) a sender address are registered as one record. It should be noted that, other information than them may be registered together such as the name of a browser program used to access the confirmation page, information on the terminal device used to access, for examples, the name of OS and/or region (i.e. country etc.) where the terminal device is located, etc.

The other components in the e-mail server device 1 in Embodiment 2 are generally the same as ones in Embodiment 1. However, the e-mail sending/receiving part 22 has functions described hereinafter.

Next, operation of the e-mail server device 1 of Embodiment 2 will be explained. Since the process when sending an e-mail is the same as one in Embodiment 1, the process will not be explained hereinafter.

Figure 9:
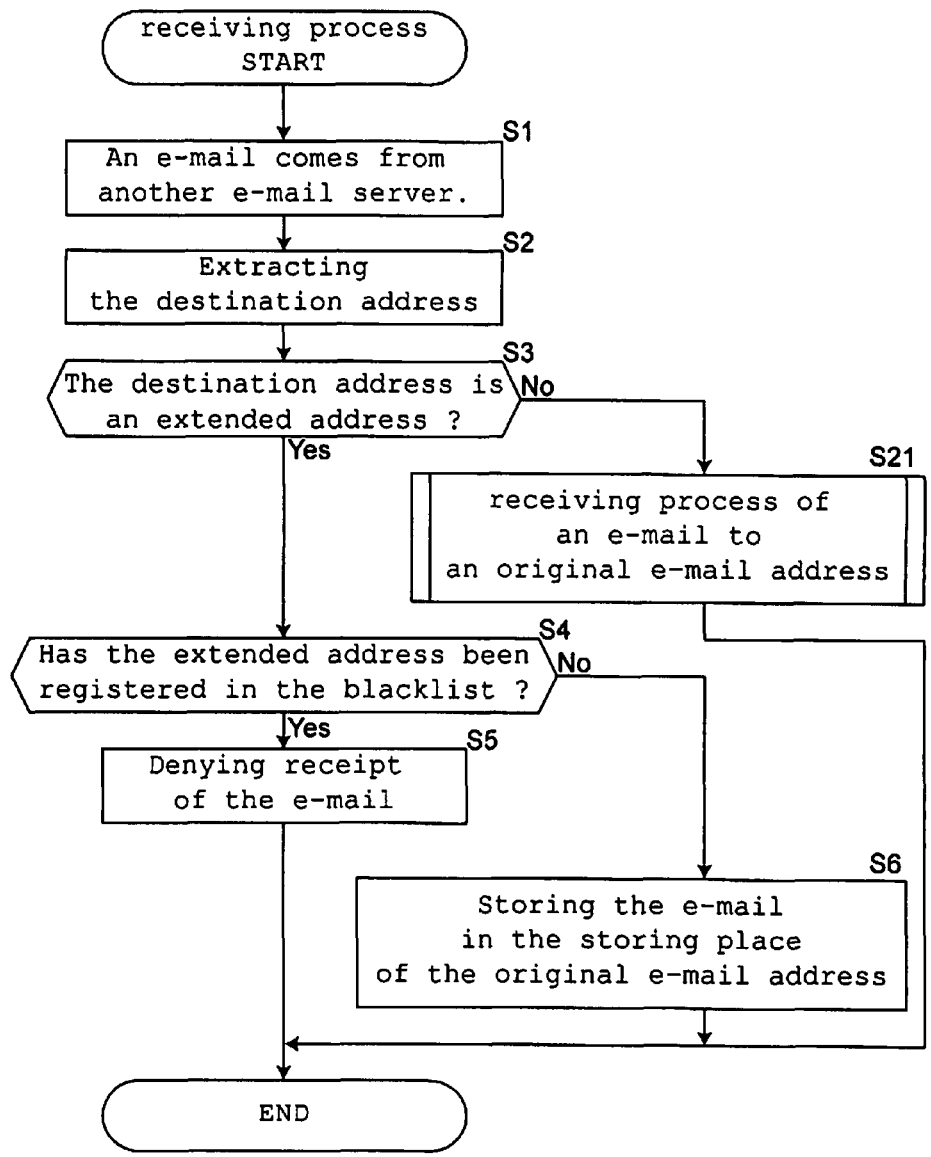
FIG. 9 shows a flowchart explaining a receiving process in the e-mail server device of Embodiment 2.
Figure 10:
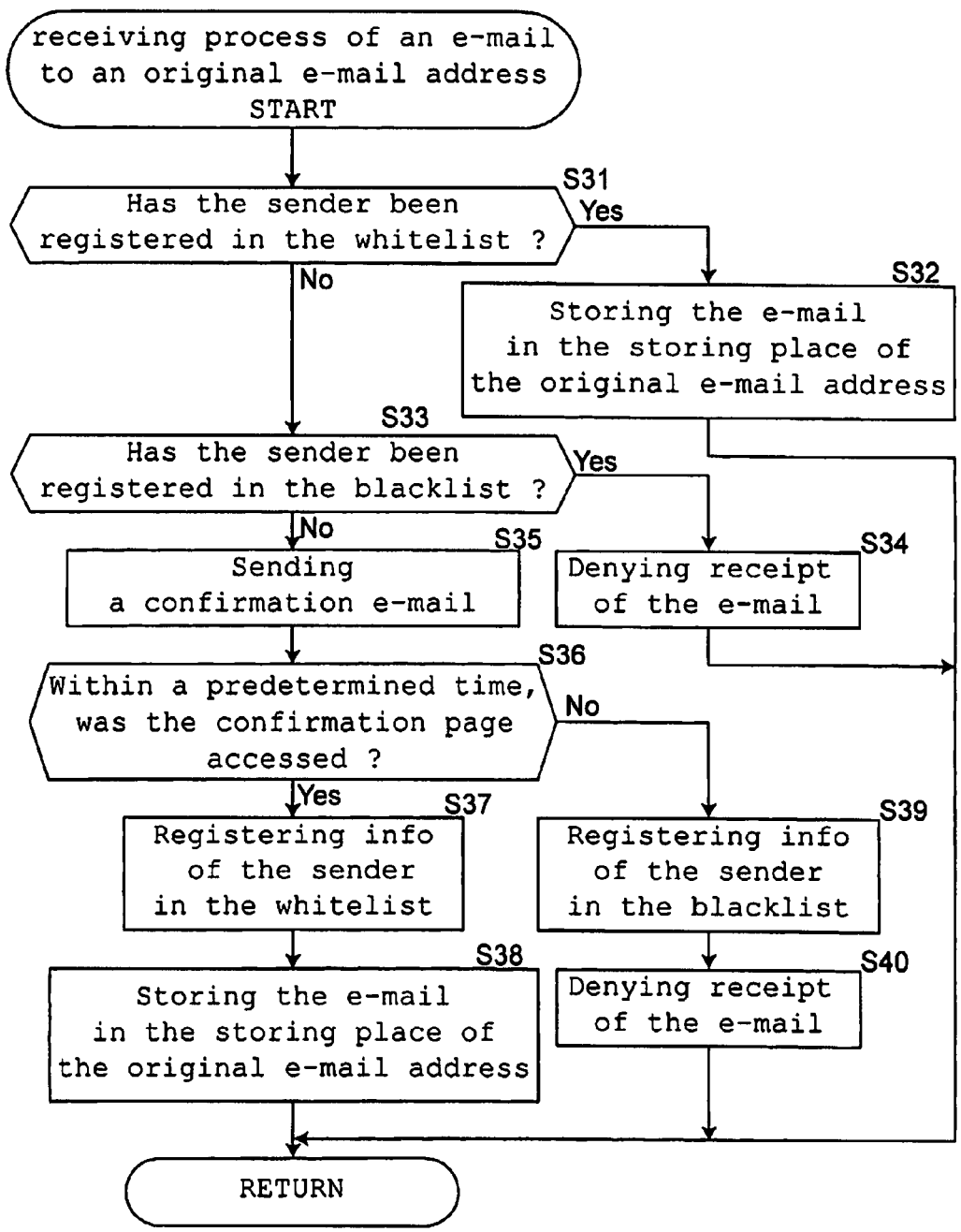
FIG. 10 is a flowchart explaining Step S21 of FIG. 9 in detail.

FIG. 9 shows a flowchart explaining a receiving process in the e-mail server device 1 of Embodiment 2. As shown in FIG. 9, the receiving process when an e-mail reaches the server device 1 in Embodiment 2 is the same as one in Embodiment 1 if the destination of the e-mail is an extended address. There is difference from Embodiment 1 on a process at Step S21 when the destination of the e-mail is an original e-mail address. Here, therefore, the receiving process (Step S21) is explained in the case that the destination of the e-mail is an original e-mail address. FIG. 10 is a flowchart explaining Step S21 of FIG. 9 in detail.

If the destination of the e-mail which reaches the device 1 is an original e-mail address, the e-mail sending/receiving part 22 refers to the whitelist 71, and determines whether the sender of the e-mail has been registered in the whitelist 71 or not (Step S31). At the time, the e-mail sending/receiving part 22 compares each IP address of an e-mail sending server registered in the whitelist 71 and the IP address of the e-mail sending server written in the e-mail and, if both are the same, determines that the sender has been registered in the whitelist 71.

If the sender has been registered in the whitelist 71, the e-mail sending/receiving part 22 accepts receipt of the e-mail and causes the e-mail to be stored in the e-mail storing part 31 (Step S32). In the e-mail storing part 31, the e-mail is stored in the mailbox of the original e-mail address.

On the other hand, if the sender has not been registered in the whitelist 71, the e-mail sending/receiving part 22 refers to the blacklist 72, and determines whether the sender of the e-mail has been registered in the blacklist 72 or not (Step S33). At the time, the e-mail sending/receiving part 22 compares each IP address of an e-mail sending server registered in the blacklist 72 and the IP address of the e-mail sending server written in the e-mail and, if both are the same, determines that the sender has been registered in the blacklist 72.

If the sender has been registered in the blacklist 72, the e-mail sending/receiving part 22 denies receipt of the e-mail (Step S34).

On the other hand, if the sender has not been registered in the blacklist 72 (i.e. the sender has not been registered in any of the lists 71 and 72), the e-mail sending/receiving part 22 stores the e-mail in a temporary storing region not shown in the figures, generates a confirmation e-mail and sends it to the sender address of the e-mail (or the return e-mail address). In brief, the e-mail sending/receiving part 22 reserves the determination of whether receipt of the e-mail is accepted or not.

Figure 11A:
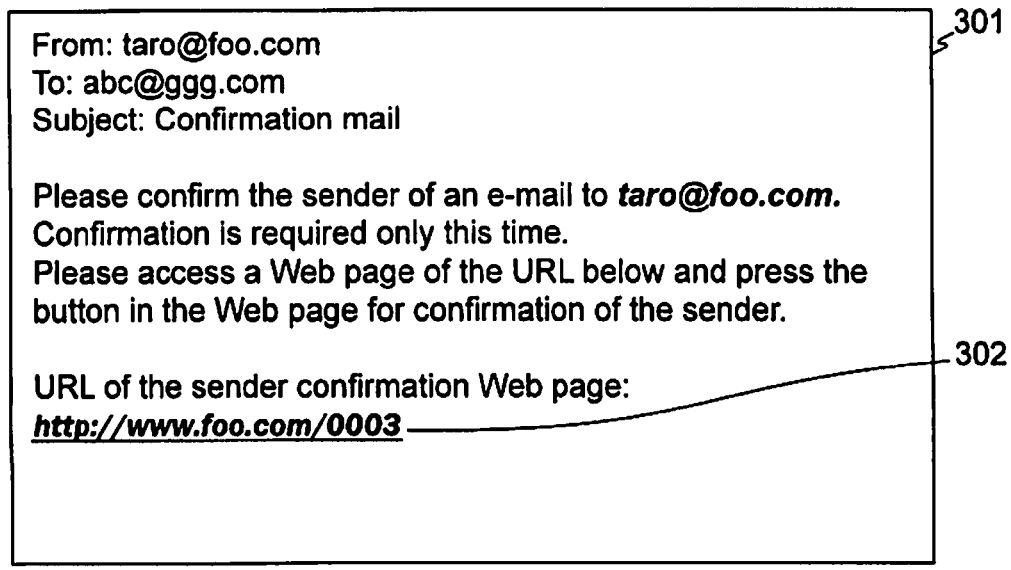
FIGS. 11A and 11B show examples of a confirmation e-mail and a confirmation page.
Figure 11B:
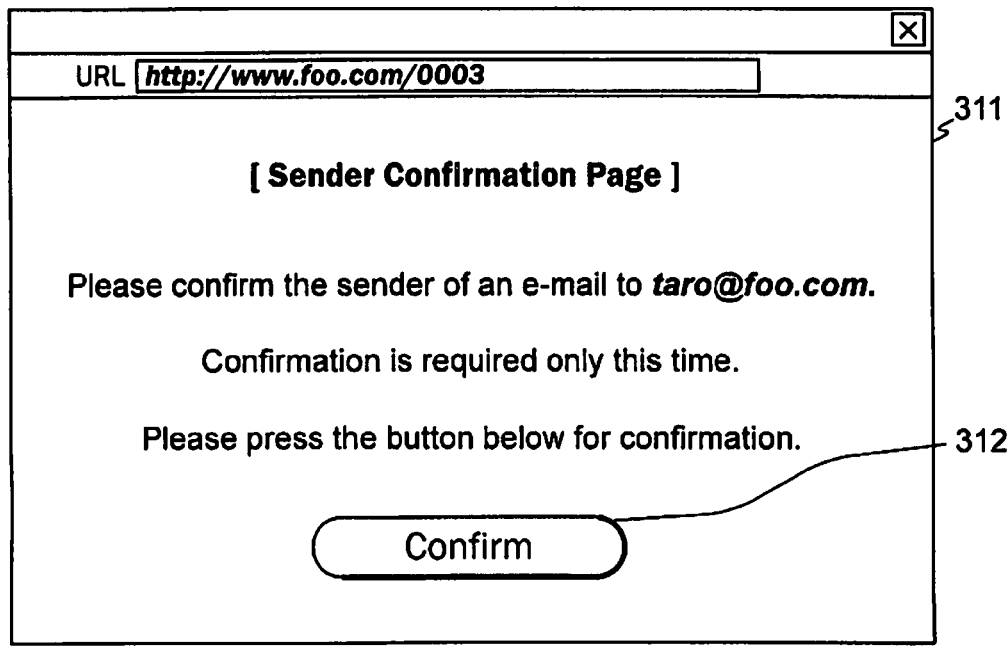

FIGS. 11A and 11B show examples of a confirmation e-mail and a confirmation page. As shown in FIG. 11A, the confirmation e-mail 301 contains a text and a hyperlink 302. The text states this e-mail is sent for confirming the sender of the e-mail received by the device 1, and the hyperlink 302 is linked to the confirmation Web page. Data of the confirmation Web page is stored in the e-mail server device 1 and the e-mail sending/receiving part 22 functions as a Web server and makes the confirmation Web page browsable via the network 2.

The sender receives the confirmation e-mail 301, then follows the hyperlink 302 in the confirmation e-mail and browses the confirmation Web page 311 as shown in FIG. 11B by using a Web browser program in a terminal device such as the terminal device 102. The confirmation Web page 311 contains a button 312 described in a programming script (such as JavaScript). When the user presses the button 312 by operating a terminal device, information of the operation (i.e. response information to the confirmation e-mail 301) is sent to the e-mail sending/receiving part 22 of the e-mail server device 1.

In normal situation, the confirmation e-mail reaches the sender of the e-mail that reaches the device 1. However, it does not reach the sender if the sender is disguised. In addition, the confirmation e-mail is often ignored if the e-mail that reached the device 1 is a nuisance e-mail.

After sending the confirmation e-mail 301, the e-mail sending/receiving part 22 determines whether accessing to the confirmation Web page 311 and pressing the button 312 happen within a predetermined time (Step S36). This predetermined time is set such as 1 hour, 24 hours, three days, etc. properly. It may be set by user.

Then, if both accessing to the confirmation Web page 311 and pressing the button 312 happen within the predetermined time, the e-mail sending/receiving part 22 registers information of the sender in the whitelist 71 (Step S37) and moves the e-mail stored in the temporary storing region to the mailbox in relation with the destination e-mail address of the e-mail (Step S38).

On the other hand, if accessing to the confirmation Web page 311 and/or pressing the button 312 do/does not happen within the predetermined time, the e-mail sending/receiving part 22 registers information of the sender in the blacklist 72 (Step S39), and denies receipt of the e-mail with discarding the e-mail stored in the temporary storing region (Step S40).

It should be noted that information of the sender may be registered in the whitelist 71 or the blacklist 72 such as the IP address of the e-mail sending server (i.e. the sender's e-mail server), the IP address of the terminal device accessing the confirmation Web page, the e-mail address of the sender, etc.

In this way, regarding an e-mail to an original e-mail address, a filtering process is executed with the whitelist 71 and the blacklist 72. If the sender of the e-mail has not been registered in any of the lists 71 and 72, then a confirmation process is executed based on the confirmation e-mail 301 and the access by the sender. According to the result of the confirmation process, it is determined whether receipt of the e-mail is accepted or not, and the sender is registered in the list 71 or 72.

Hereinafter, the blacklist registration process will be explained.

If a sender of a nuisance e-mail performs the confirmation operation above mentioned, a nuisance e-mail will be received. In such case, the user determines the received e-mail is a nuisance e-mail and sends an instruction e-mail for blocking nuisance e-mails in future. The instruction e-mail specifies the IP address of the e-mail server having sent the nuisance e-mail, and is sent to a predetermined e-mail address for registration into the blacklist. Instead of that, the nuisance e-mail may be transferred to a predetermined e-mail address for registration into the blacklist.

The e-mail account of the predetermined e-mail address for blacklist registration is possessed by the e-mail sending/receiving part 22. The e-mail sending/receiving part 22 receives the instruction e-mail, then deletes the IP address specified in the instruction e-mail from the whitelist 71, and registers the IP address in the blacklist 72. If a nuisance e-mail itself is received without any instructions, the e-mail sending/receiving part 22 should extracts the IP address of the e-mail server having sent the nuisance e-mail from the nuisance e-mail.

In this way, the sender of a nuisance e-mail is deleted from the whitelist 71 and registered in the blacklist 72, even if the sender has been registered in the whitelist 71.

At the time, an e-mail may be sent to the original e-mail address of the user for notifying the sender of the nuisance e-mail to the user. The e-mail contains the IP address of the e-mail server registered in the blacklist 72, the IP address of the terminal device accessing the confirmation Web page and the sender e-mail address.

As described above, according to the aforementioned Embodiment 2, the e-mail sending/receiving part 22 receives an e-mail if a sender of the e-mail has been registered in the whiltelist 71 and does not receive an e-mail if a sender of the e-mail has been registered in the blacklist 72. If a sender of an e-mail has been registered in neither the first list nor the second list, then the e-mail sending/receiving part 22 sends a confirmation e-mail 301 to the sender of the e-mail, and receives the e-mail only if receiving a response from the sender in a method described in the confirmation e-mail. In this Embodiment, the method is accessing a Web page and pressing a button on the Web page. Thus, even if a nuisance e-mail to an original e-mail address is happens, it is possible to deny receipt of such nuisance e-mails to the original e-mail address.

Further, according to the aforementioned Embodiment 2, the e-mail sending/receiving part 22 registers the sender of the e-mail in the whiltelist 71 if receiving the response after sending the confirmation e-mail, and registers the sender of the e-mail in the blacklist 72 if not receiving the response within a predetermined time after sending the confirmation e-mail. Thus, the sender is registered in either the whitelist 71 or the blacklist 72 based on result of the confirmation process, so that the whiltelist 71 and the blacklist 72 are built by the process of determining whether receipt is accepted or not. Therefore, any other additional processes or operations are not required for building the lists 71 and 72.

Preferred embodiments of the present invention have been described above, the present invention is not limited to those embodiments and each of the embodiments may be changed or modified variously within the scope of the present invention.

For example, in any of the embodiments, the e-mail sending/receiving part 22 may store a received e-mail in the mailbox after changing the extended address as the destination e-mail address to the original e-mail address.

Further, in any of the embodiments, an extended address as a destination and an sender address in a received e-mail may be extracted and registered in the extended address storing part 32 by the part 22. In this case, the extended address and the sender address (i.e. receiver address when registered) may be extracted and registered in the part 32 regarding only the e-mail received firstly for each of extended addresses because an e-mail received after receiving firstly is often a nuisance e-mail.

Furthermore, in any of the embodiments, when an e-mail to an extended address is received, the e-mail sending/receiving part 22 may insert the extension name of the extended address in the title of the e-mail. Thus, a user can easily assort received e-mails by using an assorting function of an e-mail client program. For example, if an e-mail to the extended address "shop1.taro@foo.com" is received and the title of it is "Hello," the title is changed such as "[shop1] Hello."

Furthermore, in any of the embodiments, the e-mail sending/receiving part 22 may manage destinations by assorting them into domains of the destinations, and may replace a sender address of an e-mail to be sent with a different extended address for each of the domains. Namely, one extended address is assigned for plural destinations belonging one domain in this case. When do so, it is also possible to generate an extended address automatically in the same manner as one mentioned above.

Furthermore, in any of the embodiments, the process of registering in the blacklist 51 or 71 may be executed on a Web page established by the e-mail server device 1, instead of using an e-mail from a user.

Furthermore, in Embodiment 2, a domain name may be used as information of a sender instead of an IP address, and information regarding the browser used to access the confirmation Web page may be added to information of the sender.

Furthermore, in Embodiment 2, when registering in blacklist 72, the sender e-mail address of a nuisance e-mail may be specified by an instruction e-mail. The e-mail sending/receiving part 22 may carry out deleting the sender from the whitelist 71 and adding the sender to the blacklist 72 based on the sender e-mail address specified in the instruction e-mail.

Furthermore, in Embodiment 2, instead of the confirmation process mentioned above, the device 1 returns BUSY status at first, and next, receives an e-mail if the e-mail comes from the same sender again. Many SPAM e-mail sending tools do not send to the same destination again if receiving BUSY status from the destination. Therefore, a confirmation process may be executed in this manner. Otherwise, the device 1 may make the sender reply to the confirmation e-mail 301 and receive the reply.

In any of the embodiments, the word "Web" means World Wide Web.

The present invention can be applied, for example, to an e-mail server used in an Internet service provider.

What is claimed is:

1. An e-mail server device, which stores a received e-mail in a storing region of a receiver according to a destination email address of the received e-mail, comprising:

an address determining means for determining whether the destination e-mail address of the received e-mail is an original e-mail address of the receiver or an extended e-mail address, wherein the extended e-mail address is generated by adding an extension name to the original e-mail address;

an e-mail storing means for storing the received e-mail in the storing region of the receiver if the received e-mail is determined to be the extended address by said the address determining means and the extended address is registered in an extended address list wherein the extended address is registered in the extended address list in relation to the original e-mail address and a sender's e-mail address;

wherein said e-mail storing means comprises an accepting means for accepting the received e-mail determined to be the original e-mail address comprising:

a first list in which at least one sender from who an e-mail may be received is registered;

a second list in which at least one sender from who an e-mail must not be received is registered;

a storing means for storing the received e-mail in the storing region of the receiver if the received e-mail address is the original e-mail address and a sender of the received e-mail has been registered in said first list;

a rejecting means for rejecting storing the received e-mail in the storing region of the receiver if the received e-mail address is the original e-mail address and the sender of the received e-mail has been registered in said second list;

an e-mail receiving means for, if the sender of the received e-mail has been registered in neither said first list nor said second list, returning a BUSY status at first, and receiving the e-mail only if the received e-mail comes from the sender again a sending means for sending a confirmation e-mail to the sender of the received e-mail if the received e-mail comes from the sender again and if the received e-mail address is the original e-mail address and the sender of the e-mail has been registered in neither said first nor said second list;

a storing means for storing the received e-mail in the storing region of the receiver if said sending means for sending the confirmation e-mail receives a response from the sender in a method described in the confirmation e-mail.

2. The e-mail server device according to claim 1, further comprising an e-mail sending means for sending an e-mail after changing a sender e-mail address to an extended address in association with an original e-mail address if the sender e-mail address is the original e-mail address.

3. The e-mail server device according to claim 2, wherein said e-mail sending means changes the sender e-mail address to a different extended address according to a destination of the e-mail to be sent.

4. The e-mail server device according to claim 3, further comprising a table having a relationship between a destination address and an extended address, wherein said e-mail sending means refers to said table and changes the sender e-mail address to the extended address associated with the destination address of the e-mail if the destination address of the e-mail has been registered in said table, and if the destination address of the e-mail has not been registered in said table, said e-mail sending means generates an extended address automatically, registers the generated extended address in said table, and changes the sender e-mail address to the generated extended address.

5. The e-mail server device according to claim 3, further comprising a table having a relationship between a domain of a destination address and an extended address, wherein said e-mail sending means refers to said table and changes the sender e-mail address to the extended address associated with a domain of the destination address of the e-mail if the domain of the destination address of the e-mail has been registered in said table, and if the domain of the destination address of the e-mail has not been registered in said table, said e-mail sending means generates an extended address automatically, registers the generated extended address in said table, and changes the sender e-mail address to the generated extended address.

6. The e-mail server device according to claim 1, further comprising an e-mail receiving means registers the sender of the received e-mail in the first list if said e-mail receiving means receives the response after sending the confirmation e-mail, and registers the sender of the received e-mail in the second list if said e-mail receiving means does not receive the response within a predetermined time after sending the confirmation e-mail.

7. The e-mail server device according to claim 1, wherein the extended address consists of the extension name at the head, a delimiter between the extension name and the original e-mail address, and the original e-mail address.

8. The e-mail server device according to claim 1, further comprising an e-mail receiving means changes the extended address as a destination address of the e-mail accepted by said receipt accepting means to the original e-mail address.

9. The e-mail server device according to claim 1, further comprising an e-mail receiving means inserts the extension name into a title of the received e-mail.

10. An e-mail server device comprising:

a computer executes an e-mail server program, wherein the computer determines whether the destination e-mail address of the received e-mail is an original e-mail address of the receiver or an extended address, wherein the extended e-mail address is generated by adding an extension name to the original e-mail address;

the computer stores the received email in the storing region of the receiver if the received e-mail is determined to be the extended address, and the extended address is registered in a extended address list wherein the extended address is registered in the extended address list in relation to the original email address and a sender's e-mail address;

the computer stores the received email in the storing region of the receiver by processing if the received e-mail is determined to be the original e-mail address, said processing comprising:

a first list in which at least one sender from who an e-mail may be received is registered;

a second list in which at least one sender from who an e-mail must not be received is registered;

the computer stores the received e-mail in the storing region of the receiver if the received e-mail address is the original e-mail address and a sender of the received e-mail has been registered in said first list;

the computer rejects storing the received e-mail in the storing region of the receiver if the received e-mail is the original address and the sender of the e-mail has been registered in said second list;

the computer returns a BUSY status at first, and receives the e-mail only if the received e-mail comes from the sender again and if the sender of the received e-mail has been registered in neither said first list nor said second list;

the computer sends a confirmation email to the sender of the received e-mail if the received e-mail comes from the sender again and if the received e-mail address is the original e-mail address and the sender of the e-mail has been registered in neither said first nor said second list;

the computer stores the received e-mail in the storing region of the receiver if said computer for sending the confirmation e-mail receives a response from the sender in a method described in the confirmation e-mail.

11. A computer-readable disk having computer-executable program for execution by a processing system, the computer-executable program for enabling an e-mail server device, comprising:

instructions for determining whether the destination e-mail address of the received e-mail is an original e-mail address of the receiver or an extended address, wherein the extended e-mail address is generated by adding an extension name to the original e-mail account name in the original e-mail address;

instruction for storing the received e-mail in the storing region of the receiver if the received e-mail is determined to be the extended address, and the extended address is registered in a extended address list wherein the extended address is registered in the extended address list in relation to the original e-mail address and a sender's e-mail address;

instruction for accepting the received e-mail comprising processing the received e-mail determined to be the original e-mail address comprising:

a first list in which at least one sender from who an e-mail may be received is registered;

a second fist in which at least one sender from who an e-mail must not be received is registered;

instruction for storing the received e-mail in the storing region of the receiver if the received e-mail is the original e-mail and a sender of the e-mail has been registered in said first list;

instruction for rejecting storing the received e-mail in the storing region of the receiver if the received e-mail is the original address and the sender of the e-mail has been registered in said second list;

instruction for returning a BUSY status at first, and receives the e-mail only if the received e-mail comes from the sender again and if the sender of the received e-mail has been registered in neither said first list nor said second list;

instruction for sending a confirmation email to the sender of the received e-mail if the received e-mail comes from the sender again and if the received e-mail address is the original e-mail address and the sender of the e-mail has been registered in neither said first nor said second list;

instruction for storing the received e-mail in the storing region of the receiver if said computer for sending the confirmation e-mail receives a response from the sender in a method described in the confirmation e-mail.

* * * * *